Oct. 2, 1945. W. A. GEIGER 2,386,107
FRICTION SHOCK ABSORBER
Filed Jan. 6, 1944 2 Sheets-Sheet 2
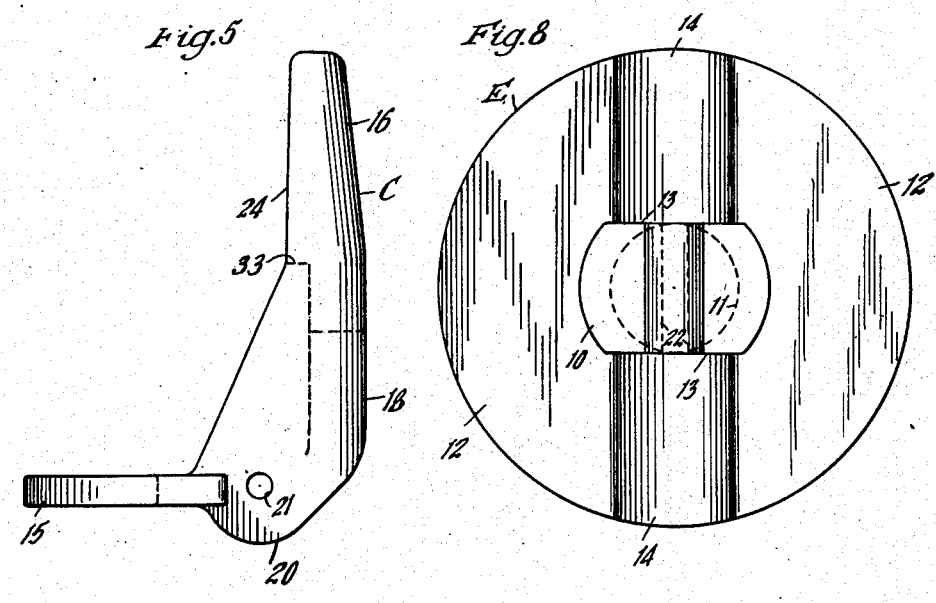
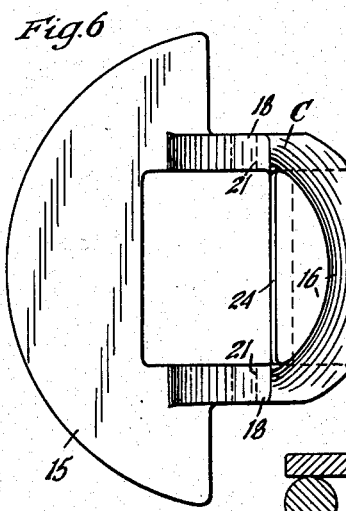
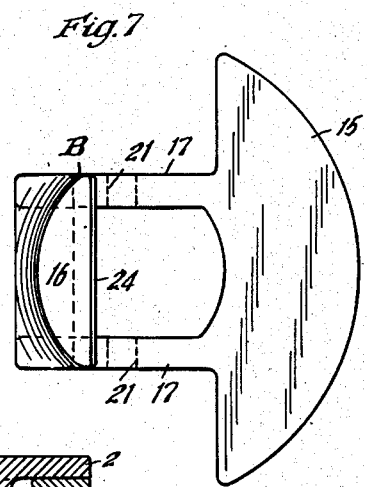
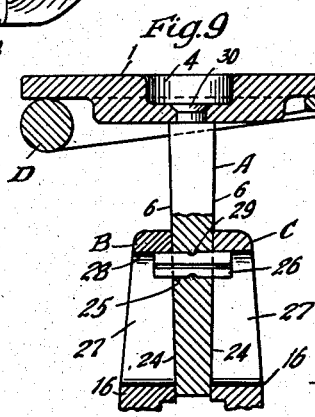
Inventor
William A. Geiger
By George I. Haight
Atty.

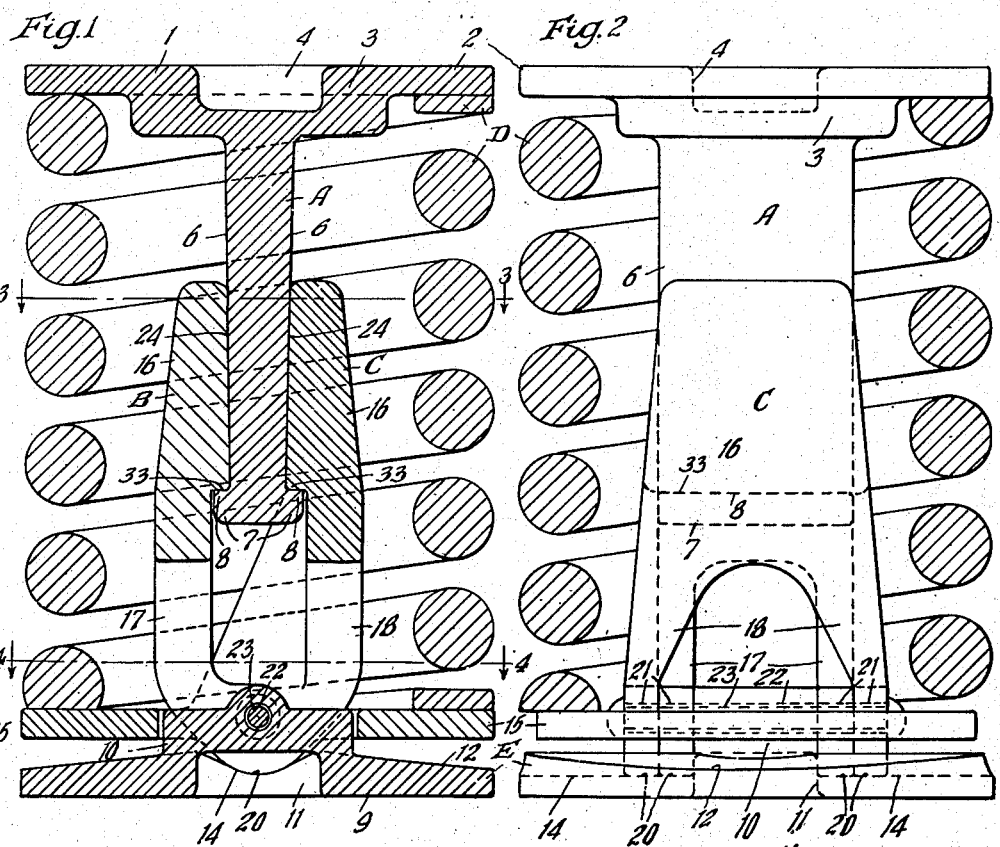
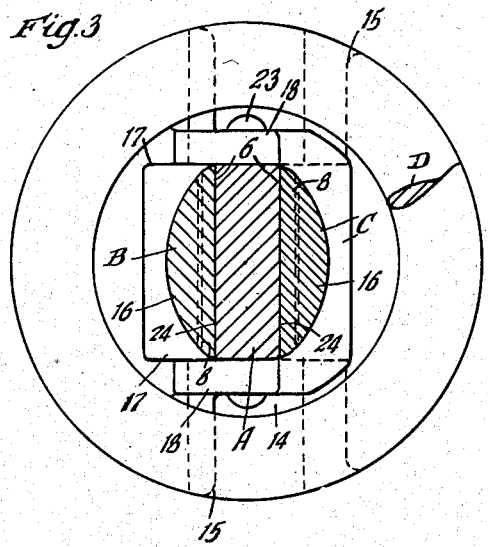
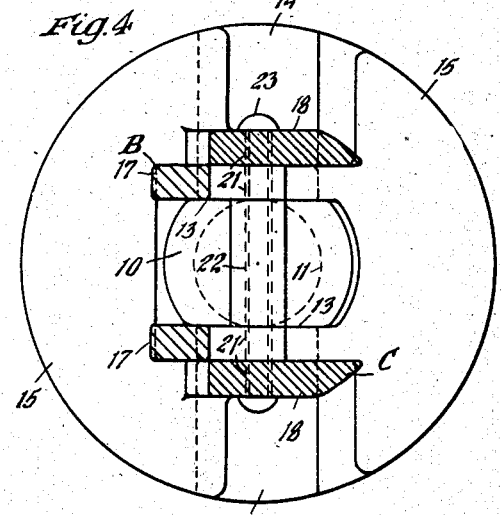

Patented Oct. 2, 1945

2,386,107

UNITED STATES PATENT OFFICE 2,386,107

FRICTION SHOCK ABSORBER

William A. Geiger, Chicago, Ill., assignor to William P. Sidley, M. F. Back, Albert P. Withall, Edwin C. Austin, and George A. Johnson, all of Chicago, Ill., and Alice T. Miner, Chazy, N. Y., as trustees of The William H. Miner Foundation Application January 6, 1944, Serial No. 517,177

4 Claims. (Cl. 267—9)

This invention relates to improvements in friction shock absorbers for use in connection with truck springs of railway cars for snubbing or dampening the action of the springs.

One of the objects of the invention is to provide a friction shock absorber to be substituted for one or more of the spring units of a cluster of truck springs of a railway car to dampen the action of the truck springs.

Another object is to provide a friction shock absorber of this character in which a friction post and a pair of friction shoe members have relative sliding frictional engagement, and a base member upon which the shoe members rock under the influence of spring means to press the shoes and post into tight frictional engagement with each other.

A more specific object is to improve the shock absorber of this type by the provision of a fulcrum plate or base member upon which the friction shoes are mounted to rock with greater freedom under spring pressure and thereby more effectively develop frictional engagement with the tapered post.

Other objects of the invention will appear from the following description and claims in connection with the accompanying drawings which illustrate one embodiment of the invention.

Referring to the drawings,

Fig. 1 is a transverse, vertical, sectional view of a friction shock absorber embodying the invention;

Fig. 2 is a view similar to Fig. 1 but with the parts, with the exception of the spring, being shown in full and at right angles to their position in Fig. 1;

Figs. 3 and 4 are horizontal sectional views on the lines 3—3 and 4—4 respectively of Fig. 1, the spring resistance being omitted from Fig. 4;

Fig. 5 is a side view of one of the friction shoes and its horizontal platform member;

Fig. 6 is a top plan view thereof;

Fig. 7 is a similar top plan view of the other shoe and its platform member;

Fig. 8 is a plan view of the fulcrum base or plate member; and

Fig. 9 is a detail section of the upper portion of the shoes and the post member showing a modified limit stop device.

As shown in the drawings, my improved shock absorber comprises broadly a friction post A, two friction shoes B and C, a spring resistance D, and a base or fulcrum plate E.

The friction post A comprises a relatively wide platelike portion 1, which forms the post member proper, having a laterally projecting annular flange 2 at the upper end, which is in the form of a heavy disc having a downwardly offset central portion 3 which is formed with a central depression or recess 4 adapted to accommodate the usual spring centering projection on the top spring plate for the truck spring cluster of the railway car. The post member proper, which depends from the disc-like portion 1, is tapered downwardly (Fig. 1), thus presenting flat friction surfaces 6 on opposite sides thereof which converge towards each other in downward direction. At its bottom end, the post has laterally outwardly projecting heavy flanges 7 at the friction sides thereof, forming in effect a head member which presents upwardly facing, horizontal stop shoulders 8.

The bottom fulcrum plate or base member E is a disc-like member substantially as large in diameter as the spring resistance D and the upper head members, and having a flat bottom face 9 to provide a flat solid support for the device. This plate has an upstanding central boss 10 on its upper side which provides for a central socket or recess 11 to accommodate the usual spring centering projection of the truck spring plate. The upper face 12 of the fulcrum plate is beveled downwardly in opposite directions from the boss 10 to provide freedom of rocking movement of the shoe members as will hereinafter appear. The boss 10 is cut away on two sides to form vertical parallel faces 13 which are spaced apart substantially the diameter of the recess 11, and from these flat faces extend diametrically outwardly the concave grooves or channels 14 which form fulcrum bearings for the shoe members.

The two friction shoes B and C are of similar design, except as hereinafter pointed out. Each shoe comprises a horizontally disposed platform portion 15 and a vertically disposed friction portion 16 connected by parallel webs 17 and 18. Each platform portion comprises a segment-shaped section which, with the other, forms almost a complete two-piece ring forming a seat for the spring resistance D.

The webs 17 and 18 of the respective shoes B and C are, as shown more clearly in Figs. 2 and 4, spaced apart wider than the vertical faces 13 of the boss 10. However, the webs 18 of shoe C are farther apart than the web 17 of shoe B, so that the webs of shoe B pass between the webs of shoe C, this being for the purpose of enabling the platform segments to be positioned on the opposite side of the center post A on which their respective friction shoe members 16 are positioned. The vertical faces 13 of the boss form shoulders which serve to prevent lateral displacement or shifting of the shoe mechanism with respect to the fulcrum plate.

The webs 17 and 18 are sufficiently wide and thick to provide the necessary strength and their lower edges extend below the planes of the segments 15 and are rounded on arcs of suitable radius, as indicated by 20 (Fig. 5) to bear upon and rock in the fulcrum channels 14 of the fulcrum plate E. As a matter of facility in holding the shoes and fulcrum plate in assembled relation while the post and spring parts are being handled and assembled, the webs 17 and 18 and the boss 10 are provided with holes 21 and 22 which are in substantial alignment when the parts are in position and which are intended to receive a suitable rivet 23. The holes provide sufficient clearance around the rivet so that the rivet does not act as a pivot when the webs of the shoes rock in their bearings on the fulcrum plate.

The friction portions 16 are provided with lateral enlargements on their inner sides which form the friction faces 24 for engagement with the faces 6 of the post, and also form downwardly facing horizontal shoulders 33 which overhang the corresponding stop flange 7 of the post and cooperate with the shoulders 8 to form limit stops to the longitudinal movement of the post. The outer sides of the friction portions of the shoes are preferably rounded off, as shown, and upwardly tapered to provide proper clearance to facilitate assembly of the parts within the spring coil.

The spring resistance D is in the form of a single coil surrounding the post A and the upstanding friction portions and the webs of the shoes B and C. The upper and lower ends of the spring bear respectively on the flanges of the post A and the segmental platforms of the shoes. In Fig. 9, a modified form of interlock between the post and the friction portions of the shoes is shown. The flanges are eliminated on the inner end of the post and instead the post A is provided with a transverse hole 25 in which is inserted a tubular cross member 26. Vertical slots 27 are provided in the friction shoe portions 16 which form shoulders 28 at their upper ends against which the tubular cross piece 26 engages to limit the lengthwise separation of the shoes and post. The tubular cross piece is preferably in the form of a split tube which can be contracted for insertion in the hole 25 and then expanded by its own resilience. A bead 29 is provided in the hole before engagement with the corresponding annular groove in the split tube to hold the tube against displacement endwise of itself. In this structure, the post and the upper head member may be made in two pieces instead of integral, and joined together by riveting or welding, as indicated at 30.

In assembling the parts of my improved shock absorber, the shoes B and C are assembled by passing the webs of shoe B between the webs of shoe C until the holes 21 of the webs are in alignment. The rounded fulcrum ends 20 of the webs are then placed in the fulcrum channels 14 and the holes 21 aligned with the hole 22 in the boss. The rivet is then inserted and headed over to hold these three elements in position. After these parts are thus assembled, the spring resistance D is placed in position on the segmental platforms of the shoes and the shoe friction portions spread apart sufficiently to admit between them the flanges 7 of the post which is inserted downwardly until the flanges pass below the shoulders 8. It is necessary to apply some force to the post which acts to compress the spring. Upon the shoulders 8 engaging the flanges 33, the parts become locked together.

The operation of the structure is as follows: Upon the cluster of springs of the railway car truck being compressed between the spring follower plates of the truck sections, the friction post A and the friction shoes B and C are moved toward each other in lengthwise direction against the resistance of the spring D. Due to the taper of the post, the cooperating ends of the shoes are spread apart and the shoes tilted on the fulcrum bearings of the webs in the bearing channels 14. The increased pressure of the spring, however, upon the platform segments increases the pressure of the friction shoe portions against the post and generates a high frictional resistance, thereby snubbing the action of the truck springs. Upon the spring follower plates being moved apart during recoil of the truck springs, the expansive action of the spring D restores all of the parts to the normal released position shown in Fig. 1, the separation of the post and shoes being limited by the stop flanges 33 and shoulders 8.

I claim:

1. In a friction shock absorber, the combination of a tapered friction post, friction shoes embracing said post on opposite sides thereof, said shoes having laterally outwardly projecting platform members extending toward and beyond the opposite shoes and adapted for rocking movement, said shoes and post being movable lengthwise with respect to each other, spring means opposing said relative longitudinal movement of said shoes and post, said spring means bearing on said platform members to rock the shoes toward the post, said platform members having rounded bearing portions below the planes thereof, and a fulcrum plate positioned beneath the platform members and having bearing channels for supporting the rounded bearing portions of said platform members for rocking movement.

2. In a friction shock absorber, the combination of a top follower plate, a friction post depending centrally from said plate, said post being tapered at its lowered end, a pair of friction shoes on opposite sides of the post, each shoe having a laterally extending platform member projecting toward and beyond the other shoe, and each shoe being connected by spaced apart webs with its platform member, the said webs having rounded bearing portions below the planes of said platform members to provide for the rocking movement of the shoe toward and away from the post, spring means surrounding said post and shoes and bearing at its opposite ends on the follower plate and the platform members to oppose the rocking movement of said shoes, a base plate below the platform members having bearing depressions for the rounded bearing portions of said webs and having an upstanding boss positioned between said bearing portions to prevent lateral displacement of said bearing portions with respect to said base plate.

3. In a friction shock absorber, the combination of a supporting base plate having an upstanding central boss forming spaced apart vertical shoulders and fulcrum bearing depressions adjacent said shoulders, a pair of friction shoes each comprising friction portions and spaced apart webs extending downwardly and having bearing portions supported for rocking movement in said bearing depressions of said base plate, the webs of one shoe being positioned between the spaced apart webs of the other shoe, laterally projecting platform segments connected to the webs of each shoe, a tapered friction post positioned between said friction portions of the shoes and movable in a lengthwise direction with respect thereto, said post having a lateral flange at its upper end and a coil spring surrounding said post and shoes and bearing at its opposite ends on said lateral flange and said platform segments.

4. In a friction shock absorber, the combination of a supporting base plate having an upstanding central boss forming spaced apart vertical shoulders and fulcrum bearing depressions adjacent said shoulders, a pair of friction shoes each comprising friction portions and spaced apart webs extending downwardly and having bearing portions supported for rocking movement in said bearing depressions of said base plate, the webs of one shoe being positioned between the spaced apart webs of the other shoe, laterally projecting platform segments connected to the webs of each shoe, a tapered friction post positioned between said friction portions of the shoes and movable in a lengthwise direction with respect thereto, said post having a lateral flange at its upper end and a coil spring surrounding said post and shoes and bearing at its opposite ends on said lateral flange and said platform segments, and an assembly pin extending through the boss of said base plate and the webs of said shoes.

WILLIAM A. GEIGER.